United States Patent
Zoryn et al.

(10) Patent No.: US 10,127,315 B2
(45) Date of Patent: Nov. 13, 2018

(54) COMPUTING FEATURES OF STRUCTURED DATA

(71) Applicant: Microsoft Technology Licensing, LLC, Redmond, WA (US)

(72) Inventors: Kanstantsyn Zoryn, Redmond, WA (US); Zhimin Chen, Redmond, WA (US); Kaushik Chakrabarti, Redmond, WA (US); James P. Finnigan, Redmond, WA (US); Vivek R. Narasayya, Redmond, WA (US); Surajit Chaudhuri, Redmond, WA (US); Kris Ganjam, Redmond, WA (US)

( * ) Notice: Subject to any disclaimer, the term of this patent is extended or adjusted under 35 U.S.C. 154(b) by 295 days.

(21) Appl. No.: 14/325,376

(22) Filed: Jul. 8, 2014

(65) Prior Publication Data
US 2016/0012051 A1    Jan. 14, 2016

(51) Int. Cl.
*G06F 17/30* (2006.01)

(52) U.S. Cl.
CPC .. *G06F 17/30864* (2013.01); *G06F 17/30533* (2013.01)

(58) Field of Classification Search
CPC ................. G06F 17/3053; G06F 17/30339
See application file for complete search history.

(56) References Cited

U.S. PATENT DOCUMENTS

| | | | | |
|---|---|---|---|---|
| 6,553,366 B1 * | 4/2003 | Miller | ............... | G06F 17/30595 |
| 8,037,108 B1 * | 10/2011 | Chang | .................. | G06F 17/303 707/803 |
| 8,645,391 B1 * | 2/2014 | Wong | ................. | G06F 17/30908 707/748 |
| 9,116,940 B1 * | 8/2015 | Gupta | .................. | G06F 17/3053 |
| 2003/0088579 A1 * | 5/2003 | Brown | ............... | G06F 17/30595 |
| 2007/0094285 A1 * | 4/2007 | Agichtein | ......... | G06F 17/30398 |
| 2008/0010267 A1 * | 1/2008 | Lim | ...................... | G06F 17/3071 |
| 2009/0259646 A1 * | 10/2009 | Fujita | .................. | G06F 17/3064 |
| 2010/0082657 A1 * | 4/2010 | Paparizos | ......... | G06F 17/30737 707/767 |
| 2012/0011115 A1 * | 1/2012 | Madhavan | ........ | G06F 17/30864 707/723 |
| 2012/0323558 A1 * | 12/2012 | Nolan | .................... | G06N 7/005 704/9 |
| 2013/0138655 A1 | 5/2013 | Yan et al. | | |
| 2014/0304279 A1 * | 10/2014 | Fuchs | ............... | G06F 17/30539 707/750 |

OTHER PUBLICATIONS

Cafarella, WebTables: Exploring the Power of Tables on the Web, 2008, ACM.*

(Continued)

*Primary Examiner* — Brittany N Allen
*Assistant Examiner* — William P Bartlett
(74) *Attorney, Agent, or Firm* — Ray Quinney & Nebeker, P.C.; Thomas M. Hardman; Brandon K. Roper

(57) ABSTRACT

The present invention extends to methods, systems, and computer program products for computing features of structured data. Aspects of the invention include computing features of table components (e.g., of rows, columns, cells, etc.). Computed features can be used for ranking the table components. When aggregated, features for different components of a table can be used for ranking the table (e.g., a web table).

20 Claims, 8 Drawing Sheets

(56) References Cited

OTHER PUBLICATIONS

Yakout, InfoGather: Entity Augmentation and Attribute Discovery by Holistic Matching with Web Tables, 2012, SIGMOD'12.*
Cafarella, Michael John. Extracting and managing structured web data. Diss. University of Washington, 2009.*
Bhagavatula, et al., "Methods for Exploring and Mining Tables on Wikipedia", In Proceedings of the ACM SIGKDD Workshop on Interactive Data Exploration and Analytics, Aug. 11, 2013, 9 pages.
Venetis, et al., "Table Search Using Recovered Semantics", In Proceedings of the VLDB Endowment, Sep. 13, 2010, 11 pages.
Wang, et al., "Understanding Tables on the Web", In Proceedings of the 31st international conference on Conceptual Modeling, Oct. 2012, 14 pages.
Cafarella, et al., "Data Integration for the Relational Web", In Proceedings of the VLDB Endowment, vol. 2 Issue 1, Aug. 24, 2009, 12 pages.
"Structured Data Search", Published on: Feb. 23, 2013, Available at: http://research.microsoft.com/en-us/projects/structureddatasearch/.
Cafarella, et al., "Uncovering the Relational Web", In Proceedings of the 11th International Workshop on Web and Databases, Jun. 13, 2008, 6 pages.
"Web Data Commons—Web Tables", Retrieved on: Apr. 11, 2014, Available at: http://webdatacommons.org/webtables/.

* cited by examiner

COMPUTING FEATURES OF STRUCTURED DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Search engines can be used on networks, including the Internet, to locate information of interest to a user. A search engine typically uses a crawler that continual crawls Web pages on a network, such as, the Internet, to index content. To find content, a user submits one or more search terms to the search engine. The search engine identifies pages deemed to contain content relevant to the one or more search terms. The search engine then returns links to the identified pages back to the user. The user can then select (e.g., "click") a link to view content of a corresponding page.

A structured data search system (SDSS) similarly crawls a network, such as the Internet, to index structured information. Structured information can include tables in a relational database or HTML tables extracted from Web pages. To find structured data, a user submits one or more search terms to the SDSS. The SDSS identifies structured data, such as, a table, deemed to contain content relevant to the one or more search terms. The search engine then returns the structured data back to the user. The user can then integrate the structured data into their applications.

Due to the diversity of content generation on the Internet, the definition and content of structured data as well as the integration of structured data into a Web page can vary widely between different Web pages. As such, it can be difficult to effectively index structured data, such as, tables. When structured data is not appropriately indexed, search results are less relevant.

Further, even when multiple portions of structured data (e.g., multiple tables) are match search terms, there may be no way to determine an order in which to present the different portions. Determining an order becomes increasingly difficult as the number of identified portions increases. For example, hundreds or even thousands of tables can be returned as a match for entered search terms. Although some tables may be more relevant than other tables, it may be difficult to identify more relevant tables and present the more relevant tables prior to less relevant tables.

BRIEF SUMMARY

The present invention extends to methods, systems, and computer program products for computing features of structured data. Aspects of the invention include computing features of table components (e.g., of rows, columns, cells, etc.). Computed features can be used for ranking the table components. When aggregated, features for different components of a table can be used for ranking the table (e.g., a web table).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
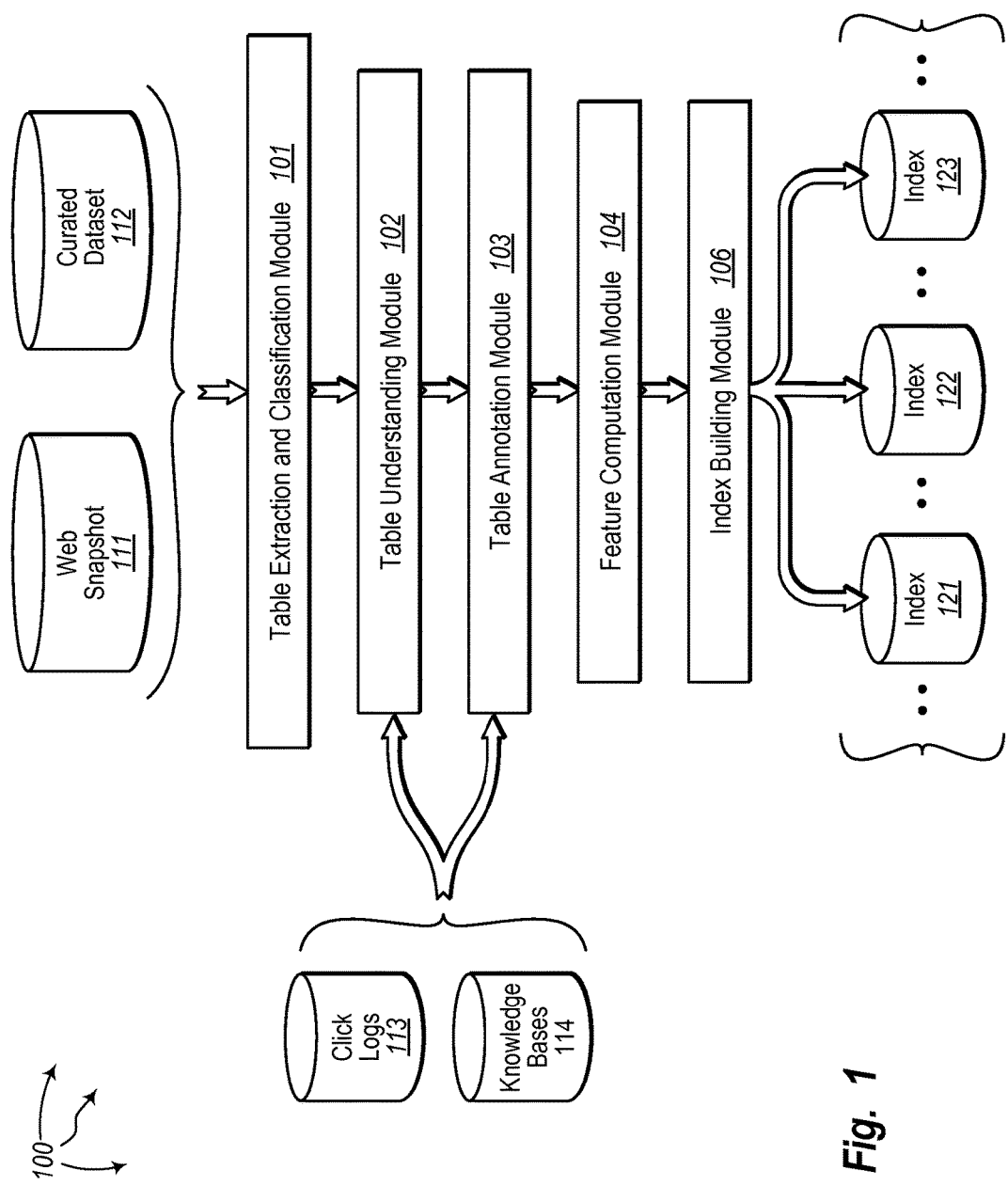
FIG. 1 illustrates an example computer architecture that facilitates building one or more indexes from one or more datasets of structured data.

The present invention extends to methods, systems, and computer program products for computing features of tables. Aspects of the invention include computing features of table components (e.g., of rows, columns, cells, etc.). Computed features can be used for ranking the table components. When aggregated, features for different components of a table can be used for ranking the table (e.g., a web table).

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In these description and the following claims, a "table" is defined as set of data elements (values) arranged in a two dimensional structure and having data along two axes. A table can include vertical columns and horizontal rows. Columns and rows can be viewed interchangeably. When a table is rotated 90 degrees, columns can transition to rows and rows can transition columns.

Each intersection of a row and column represents a cell. Rows can be identified by the values appearing in a specified column subset, for example, identified as a key index. Tables can be found in databases, in web pages, in curated datasets, captured from images (e.g., whiteboards), found in other files (e.g., Portable Document Format ("PDF") files), or found in other sources, etc. Aspects of the invention can be used to understand tables from any of these sources.

One or more columns of a table can be subject columns. A subject column contains the names of entities the table is about. Other columns in a table represent relationships or attributes of entities in a subject column. A subject column can be viewed as an approximate key.

A row of a table can be a column header. A column header for a table contains names of the table's columns.

Aspects of the invention include computing features of tables that can be used for table ranking. For example, features of web tables can be computed. The computed features can be used to rank web tables relative to one another.

Index Build Architecture

FIG. 1 illustrates an example computer architecture 100 that facilitates building one or more indexes from one or more datasets of structured data. Referring to FIG. 1, computer architecture 100 includes table extraction and classification module 101, table understanding module 102, table annotation module 103, feature computation module 104, index building module 106, web snapshot 111, curated dataset 112, click logs 113, knowledge bases 114, and indexes 121, 122, and 123. Each of table extraction and classification module 101, table understanding module 102, table annotation module 103, feature computation module 104, index building module 106, web snapshot 111, curated dataset 112, click logs 113, and knowledge bases 114, and indexes 121, 122, and 123 can be connected to one another over (or be part of) a network, such as, for example, a Local Area Network ("LAN"), a Wide Area Network ("WAN"), and even the Internet. Accordingly, each of table extraction and classification module 101, table understanding module 102, table annotation module 103, feature computation module 104, index building module 106, web snapshot 111, curated dataset 112, click logs 113, and knowledge bases 114, and indexes 121, 122, and 123, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, computer architecture 100 can leverage web snapshot 111, and possibly also one or more curated datasets 112, to build one or more of indexes 121, 122, and 123. Computer architecture 100 can extract tables from web snapshot 111 and/or one or more curated datasets 112, understand and annotate the extracted tables, and build one or more of indexes 121, 122, and 123 based on the understanding/annotation of the tables. Indexes 121, 122, and 123 can then be used by an index serve component to retrieve candidate results to user queries as well as rank candidate result tables based on relevance. Each of indexes 121, 122, and 123 can be a different type of index, such as, for example, a string mapping index that maps tokens to identifiers and contains inverse document frequencies of the tokens, a keyword (inverted) or feature index that can be used to retrieve top ranked tables for user queries, or a table content index that can be used to generate previews/snippets for retrieved tables as well as fetch complete tables when requested.

Within computer architecture 100, table extraction and classification module 101 can receive web snapshot 111 and/or curated data set 112 as input. Web snapshot 111 can include tables in HyperText Markup Language (HTML) format. Curated dataset 112 can include tables in a site specific format, such as, for example, data from data.gov or the World Bank. Web snapshot 111 and curated dataset 112 can be created using wrappers and/or crawlers that scrape sites, understand the format of those sites, and extract tables. For example, Web snapshot 111 can be created from scraping the Internet. Thus, Web snapshot 111 can include web tables. The web tables can be relational or non-relational. Some tables may expressly define a subject column and column headers. Other tables may lack an express definition of a subject column and/or column headers.

Table extraction and classification module 101 can extract tables from web snapshot 111 and/or curated data set 112. Table extraction and classification module 101 can filter out tables of no value, such as, for example, tables used for navigational/layout purposes. From any remaining tables, table extraction and classification module 101 can classify tables as relational and/or non-relational tables. In one aspect, table extraction and classification module 101 also filters out non-relational tables. Table extraction and classification module 101 can output tables (e.g., relational tables) for use by other modules in computer architecture 100.

Click logs 113 can include link selection information ("clicks") logged for a plurality of network users. For the Internet, click logs 113 can include link selection information for a larger plurality of users. Knowledgebases 114 can include different classes of knowledgebase. One class of knowledgebase can contain structured information about entities and/or relationships between entities, such as, for example, tables in web snapshot 111 and/or curated dataset 112. For example, a knowledge base can include information about table entities, including: entity names, entity types, entity attributes, and values for entity attributes. Another class of knowledgebase are those extracted from Web documents (e.g., using text patterns).

Table understanding module 102 can receive tables (e.g., relational tables) extracted by table extraction and classification module 101 as input. Table understanding module 102 can use various different table understanding algorithms to understand tables. Some tables may lack expressly defined subject columns and/or expressly defined column headers. As such, table understanding algorithms can be configured to identify subject columns for tables and/or detect column headers for tables when tables do not expressly define such information. Table understanding module 102 can utilize click logs 113 and knowledgebases 114 to assist with understanding tables. Table understanding module 102 can output identified subject columns and detected column headers for tables.

Table annotation module 103 can receive tables (e.g., relational tables) extracted by table extraction and classification module 101. Table annotation module 103 can also receive identified subject columns and detected column headers for tables (e.g., from table understanding module 102). Table annotation module 103 can use various different table annotation algorithms to annotate tables with relevant content that is not expressly defined as being associated with tables. For example, on a web page containing a table, content within <table> and </table> tags (e.g., cell values and column names) can be useful in supporting keyword and data finding searches.

However, there can also be additional content useful in supporting keyword and data finding searches that is not within <table> and </table> tags. For example, additional content can be on a web page outside <table> and </table> tags, additional content can be in other web pages containing links to the web page, additional content can be in click log data, etc. As such, table annotation algorithms can be configured to identify this additional content and annotate corresponding tables with the additional content. Subsequently, index building module 106 can generate inverted index over this additional content as well as content within <table> and </table> tags.

Table annotation module 103 can utilize click logs 113 and knowledge bases 114 to assist with identifying additional content and annotating corresponding tables with the additional content. Table annotation module 103 can output tables annotated with corresponding additional content.

Feature computation module 104 can receive tables. Feature computation module 104 can use various feature computation algorithms to compute (static) features of tables. The computed (static) features can be used for ranking. For example, feature computation module 104 can compute static (i.e., query independent) features of web tables for use in relevant ranking. Rankings can be used to help surface better (e.g., more reputed, more popular, or more relevant) web tables when many web tables satisfy a search query. Feature computation module 104 can output computed (static) features for tables.

Feature computation module 104 can be used with annotated or unannotated tables. When feature computation module 104 receives annotated tables, the various feature computation algorithms can use additional content contained in annotations to compute (static) features.

Index building module 106 can receive tables. Index building module 106 can use various index building algorithms to build one or more of indexes 121, 122, and 123 from received tables. Index building module 106 can receive annotated or unannotated tables. When index building module 106 receives annotated tables, the various index building algorithms can use additional content contained in annotations when building indexes. Index building module 106 can also access computed (static) features for tables. When index building module 106 accesses computed (static) features for tables, the various index building algorithms can use the computed (static) features when building indexes.

Computing Features of Table Entities

Figure 2:
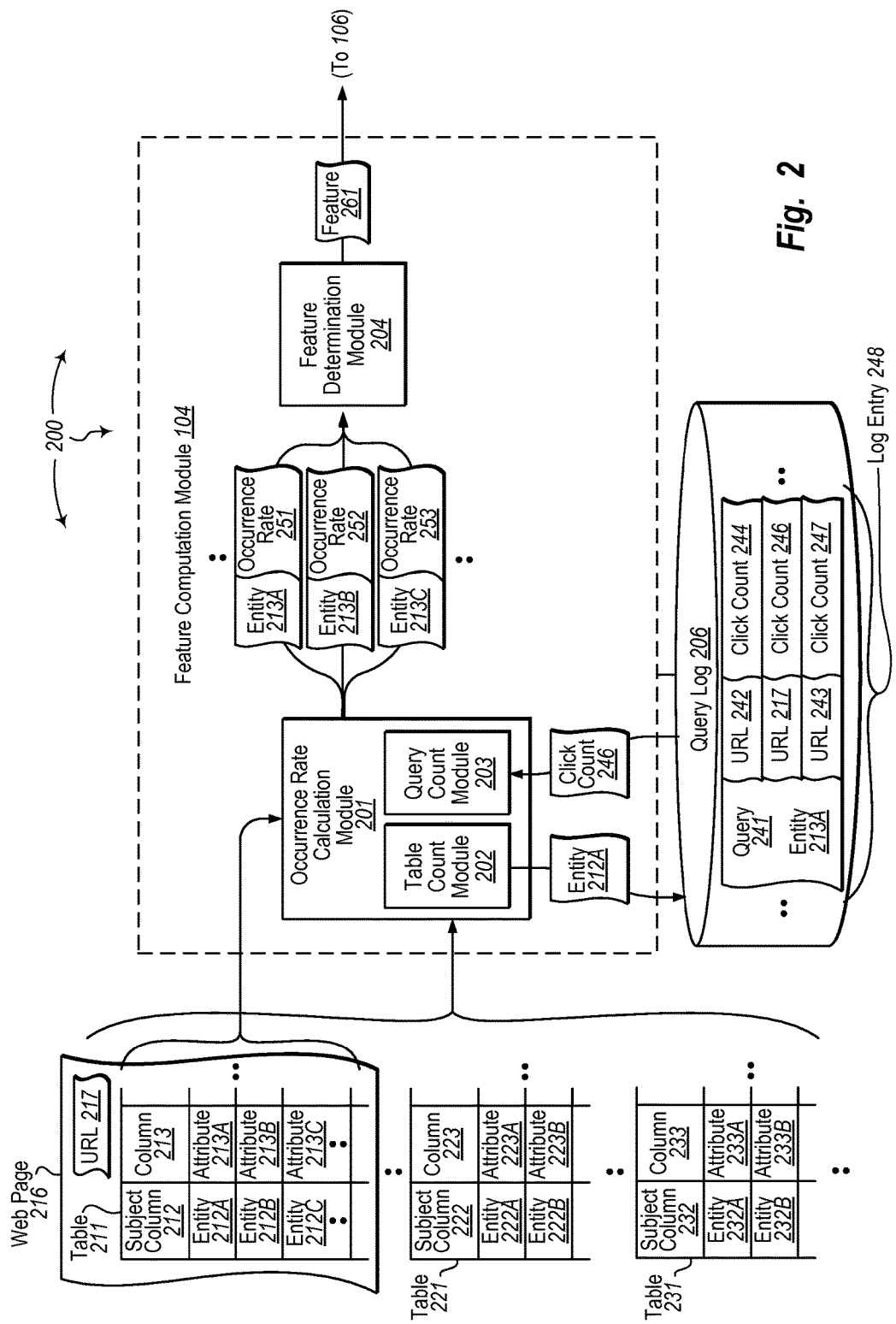
FIG. 2 illustrates an example computer architecture that facilitates computing features of table entities.

FIG. 2 illustrates an example computer architecture 200 that facilitates computing features of table entities. Referring to FIG. 2, computer architecture 200 includes occurrence rate calculation module 201, feature determination module 204, and query log 206. Each of occurrence rate calculation module 201, feature determination module 204, and query log 206 can be connected to one another over (or be part of) a network, such as, for example, a Local Area Network ("LAN"), a Wide Area Network ("WAN"), and even the Internet. Accordingly, each of occurrence rate calculation module 201, feature determination module 204, and query log 206 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Occurrence rate calculation module 201 and feature determination module 204 can be included in feature computation module 104. Alternatively, occurrence rate calculation module 201 and feature determination module 204 can operate outside of feature computation module 104.

Generally, occurrence rate calculation module 201 is configured to determine the occurrence rate of table entities within other table related data. As depicted, occurrence rate calculation module 201 further includes table count module 202 and query count module 203. Table count module 202 is configured to count how many tables (e.g., included in web snapshot 111) include a specified entity in their subject column. In some aspects, the specified entity is a value from the subject column of another table.

Query log 206 contains a log of issued search queries and corresponding click counts for Uniform Resource Locations (URLs) selected from search results presented in response to the issued search queries. Query count module 203 is configured to access a URL click count for an entity from query log 206.

In one aspect, one of table count module 202 or query count module 203 is used to calculate a count representing the popularity and/or trustworthiness of an entity. In another aspect, table count module 202 and query count module 203 interoperate to calculate a count representing the popularity and/or trustworthiness of an entity. Popularity can indicate the frequency with which an entity is included in other tables and/or is selected from search results (i.e., quantity). Trustworthiness can indicate how relevant an entity is based on inclusion in other tables and/or selection from search results (i.e., quality).

Feature determination module 204 is configured to determine the popularity and/or trustworthiness of a table by aggregating the determined popularity and/or trustworthiness of entities in the table. An aggregation function can be used to aggregate entity counts into a feature of the table. The aggregation function can determine features using one or more of mean or median and various quantiles.

The aggregation function can be robust to ambiguities. For example, when considering entity occurrences in other tables, the aggregation function can account for name ambiguities, such as, between a scientist named Michael Jordan and the basketball player name Michael Jordan. The aggregation function does not incorrectly increase the popularity of the scientist Michael Jordan is based on the popularity of the basketball player Michael Jordan. Ambiguity (e.g., name ambiguity) is less problematic when considering click counts because users can disambiguate themselves prior to selecting a URL.

In one aspect, a knowledge base internally uses globally unique identifiers (GUID's) for each entity. Table entities can be linked to the knowledge base. Aggregation can then be performed for GUIDs.

Figure 3:
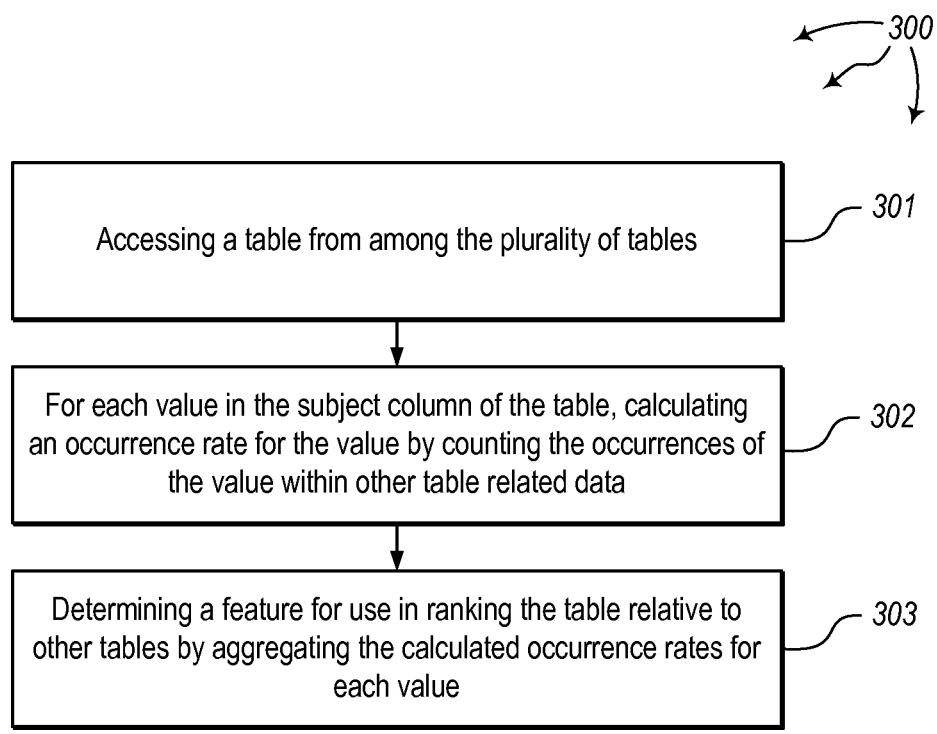
FIG. 3 illustrates a flow chart of an example method for computing features of table entities.

FIG. 3 illustrates a flow chart of an example method 300 for computing features of table entities. Method 300 will be described with respect to the components and data of computer architecture 300.

Occurrence rate calculation module 201 can have access to a plurality of tables (e.g., web tables) including tables 211, 221, and 231. The plurality of tables can be contained in web snapshot 111, curated dataset 112, etc. Occurrence rate calculation module 201 can access one or more of the plurality of tables. Occurrence rate calculation module 201 can interoperate with feature determination module 204 to determine table features for accessed tables.

Method 300 includes accessing a table from among the plurality of tables (301). For example, occurrence rate calculation module can access table 211. As depicted, table 211 is contained in web page 216. Web page 216 is accessible via Uniform Resource Locator (URL) 217. Table 211 has subject column 212, column 213, etc. Subject column 212 contains entities of the table including entities 212A, 212B, 212C, etc. Column 213 contains corresponding attributes of the entities in (i.e., on the same row as) subject column 212 including attributes 213A, 213B, 213C, etc. Other columns of table 211 contain other corresponding attributes of the entities in (i.e., on the same row as) subject column 212.

Similarly, table 221 has subject column 222, column 223, etc. Subject column 212 contains entities of the table including entities 222A, 222B, etc. Column 223 contains corresponding attributes of the entities in (i.e., on the same row as) subject column 222 including attributes 223A, 223B, etc. Other columns of table 221 contain other corresponding attributes of the entities in subject column 222.

Likewise, table 231 has subject column 232, column 233, etc. Subject column 232 contains entities of the table including entities 232A, 232B, etc. Column 233 contains corresponding attributes of the entities in (i.e., on the same row as) subject column 232 including attributes 233A, 233B, etc. Other columns of table 231 contain other corresponding attributes of the entities in subject column 232.

Other tables in the plurality of tables, such as, for example, tables included in web snapshot 111, curated dataset 112, etc. can be similarly configured.

Method 300 includes for each value in the subject column of the table, calculating an occurrence rate for the value by counting the occurrences of the value within other table related data (302). For example, occurrence rate calculation module 201 can calculate an occurrence rate for each of entities 212A, 212B, 213C, etc. by counting the occurrences of each of entities 212A, 212B, 213C, etc. within other table related data. Calculating occurrences in other table related data can include counting occurrences in other tables (table 221, table 231, other tables in web snapshot 111, other tables in curated data set 112, etc.) and/or accessing click count data from query log 206 (or click logs 113).

For example, for each of entity 212A, 212B, 2121C, etc., table count module 202 can calculate the number of occurrences of the entity in the subject column of other tables. Table count module 202 can calculate how many other tables include entity 212A in the subject column, how many other tables include entity 212B in the subject column, how many other tables include entity 212C in the subject column, etc. For example, table count module 202 can determine if entity 212A is included in subject column 222, is included in subject column 232, etc.

Determining if an entity in the subject column of one table is included in the subject column of another table can include comparing entities. For example, table count module 202 can compare entity 212A to entities 221A, 222B, etc. to determine of entity 212A is included in table 221. Similarly, table count module 202 can compare entity 212A to entities 231A, 232B, etc. to determine of entity 212A is included in table 231. Table count module 202 can also compare entity 212A to entities in the subject column of other tables (e.g., included in web snapshot 111, curated dataset 112, etc.). Table count module 202 can perform similar comparisons for entity 212B, 212C, etc.

A comparison algorithm can be robustly configured to account for less (or non) relevant differences between entities. For example, a comparison algorithm can account for different formats, minor differences (misspellings, smaller differences in larger numbers, etc.) between entities, etc. or combinations thereof. For example, "Jordan, Michael" can be counted as "Michael Jordan" or vice versa. "Micheal Jordan" can also be counted as "Michael Jordan". "1,560, 437" can be counted as "1,560,386". "1 million" can be counted as "1,000,231".

Query count module 203 can refer to query log 206 (and/or click logs 113) to access click count data for each entity, such as, entity 212A, entity 212B, entity 212C, etc., in a subject column. For example, query count module 203 can submit entity 212A to query log 206. Query log 206 can refer to log entry 248. Log entry 248 is for query 241 (a log entry for a query that includes entity 212A). Log entry 248 indicates that URLs 242, 217, and 243 have been selected from search results presented in response to query 241. URLs 242, 217, and 243 are associated with corresponding click counts 244, 246, and 247 respectively. Each click count indicates how often a corresponding URL was selected from presented search results.

As described, URL 217 is the URL for accessing Web page 216. As such, query log 206 can return click count 246 to query count module 203 for entity 212A. Click count 246 indicates how often URL 217 was selected from search results presented in response to query 241 (a query that contains entity 212A).

Query count module 203 can similarly refer to query log 206 (or click logs 113) for entity 212B, entity 212C, etc. to obtain corresponding click counts.

In some aspects, table count module 202 calculates an occurrence rate for an entity based on the number of occurrences of the entity in other tables. In another aspect, query count module 203 calculates an occurrence rate for an entity based on a click count for the entity. In a further aspect, table count module 202 and query count module 203 interoperate to calculate an occurrence rate for an entity based on the number of occurrences of the entity in other tables and based on a click count for the entity. For example, table count module 202 and/or query count module 203 can calculate occurrence rates 251, 252, 253, etc. for entities 212A, 212B, 212C, etc. respectively.

Occurrence rate calculation module 201 can send entities and corresponding occurrence rates to feature determination module 204. For example, occurrence rate calculation module 201 can send entity 213A and occurrence rate 251, entity 213B and occurrence rate 252, entity 213C and occurrence rate 253, etc. to feature determination module 204. Feature determination module 204 can receive entities and corresponding occurrence rates from occurrence rate calculation module 201. For example, feature determination module 204 can receive entity 213A and occurrence rate 251, entity 213B and occurrence rate 252, entity 213C and occurrence rate 253, etc. from occurrence rate calculation module 201.

Method 300 includes determining a feature for use in ranking the table relative to other tables by aggregating the calculated occurrence rates for each value (303). For example, feature determination module 204 can determine feature 261 by aggregating occurrence rates 251, 252, 253, etc. Feature 261 can indicate the popularity and/or trustworthiness of table 211 relative to other tables. Feature 261 can be used to rank table 211 relative to other tables, such as, for example, tables 221, and 231, or other tables in web snapshot 111 and/or curated dataset 112 (e.g., in search results). Feature 261 can be sent to index building module 106 for use in formulating indices, such as, indices 121, 122, 123, etc.

More popular and/or more trustworthy tables can be ranked higher in search results.

Computing Features Of Table Attributes

Figure 4:
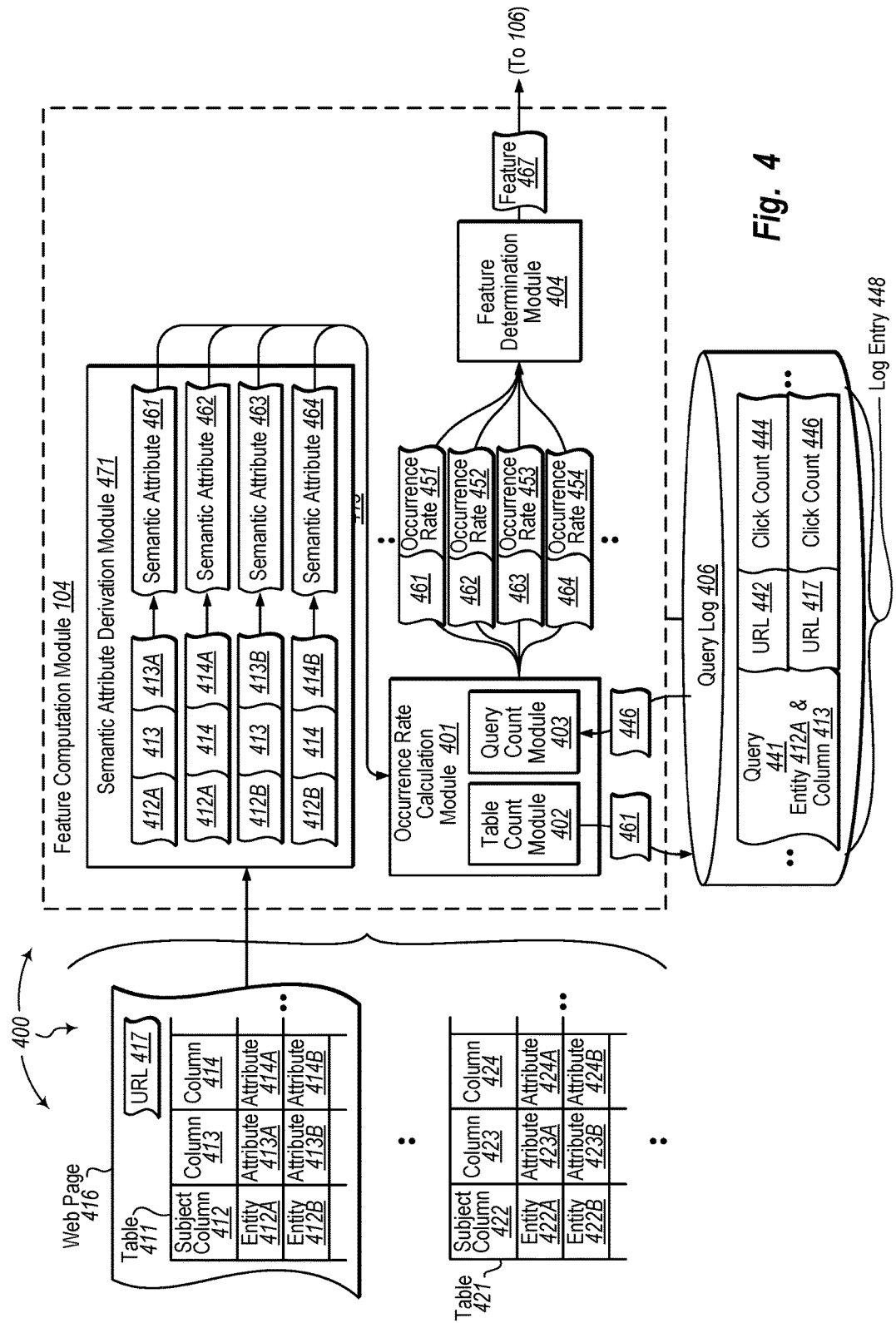
FIG. 4 illustrates an example computer architecture that facilitates computing features of table attributes.

FIG. 4 illustrates an example computer architecture 400 that facilitates computing features of table attributes. Referring to FIG. 4, computer architecture 400 includes semantic attribute derivation module 471, occurrence rate calculation module 401, feature determination module 404, and query log 406. Each of semantic attribute derivation module 471, occurrence rate calculation module 401, feature determination module 404, and query log 406 can be connected to one another over (or be part of) a network, such as, for example, a Local Area Network ("LAN"), a Wide Area Network ("WAN"), and even the Internet. Accordingly, each of semantic attribute derivation module 471, occurrence rate calculation module 401, feature determination module 404, and query log 406 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Semantic attribute derivation module 471, occurrence rate calculation module 401, and feature determination module 404 can be included in feature computation module 104. Alternatively, semantic attribute derivation module 471, occurrence rate calculation module 401, and feature determination module 404 can operate outside of feature computation module 104.

Generally, sematic attribute derivation module 471 is configured to derive semantic attributes for cell values (i.e., intersection of column/row) in non-subject columns A semantic attribute can be derived from a cell value along other related data in a table, such as, for example, a corresponding entity value (i.e., the corresponding value in the subject column), a column name associated with the cell, etc. A semantic attribute can help distinguish between columns that otherwise appear the same based on textual description. For example, two different tables may have a column called "Population". However, the column in one table may refer to overall population (e.g., of a State) and the column in the other table may refer to Asian population (e.g., of the State). Since a semantic attribute is derived from a cell value and other table data, semantic attributes for columns that otherwise appear the same can be used to distinguish the columns.

Generally, occurrence rate calculation module 401 is configured to determine the occurrence rate of semantic attributes within other table related data. As depicted, occurrence rate calculation module 401 further includes table count module 402 and query count module 403. Table count module 402 is configured to count how many tables (e.g., included in web snapshot 111) include a specified semantic attribute in their subject column.

Query log 406 contains a log of issued search queries and corresponding click counts for Uniform Resource Locations (URLs) selected from search results presented in response to the issued search queries. Query count module 403 is configured to access a URL click count for a semantic attribute from query log 406.

In one aspect, one of table count module 402 or query count module 403 is used to calculate a count representing the popularity and/or trustworthiness of a semantic attribute. In another aspect, table count module 402 and query count module 403 interoperate to calculate a count representing the popularity and/or trustworthiness of a semantic attribute. Popularity can indicate the frequency with which a semantic attribute is included in other tables and/or is selected from search results (i.e., quantity). Trustworthiness can indicate how relevant a semantic attribute is based on inclusion in other tables and/or selection from search results (i.e., quality).

Feature determination module 404 is configured to determine the popularity and/or trustworthiness of a table by aggregating the determined popularity and/or trustworthiness of semantic attributes in the table. An aggregation function can be used to aggregate semantic attribute counts into a feature of the table. The aggregation function can determine features using one or more of mean or median and various quantiles.

Figure 5:
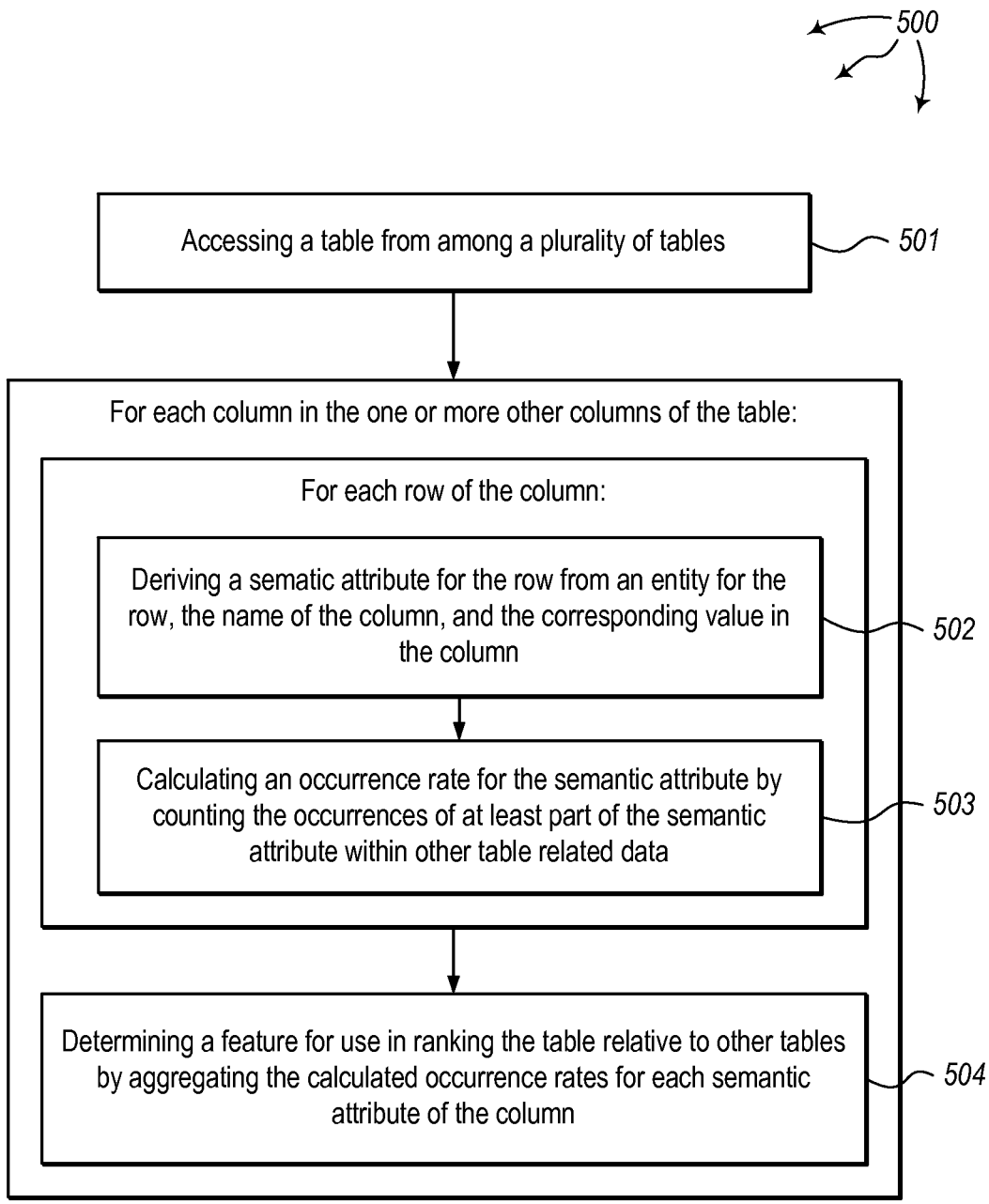
FIG. 5 illustrates a flow chart of an example method for computing features of table attributes.

FIG. 5 illustrates a flow chart of an example method 500 for computing features of table attributes. Method 500 will be described with respect to the components and data of computer architecture 400.

Semantic attribute derivation module 471 can have access to a plurality of tables (e.g., web tables) including tables 411 and 421. The plurality of tables can be contained in web snapshot 111, curated dataset 112, etc. Semantic attribute derivation module 471 can access one or more of the plurality of tables. Semantic attribute derivation module 471 can derive semantic attributes for values in a table.

Method 500 includes accessing a table from among a plurality of tables (501). For example, semantic attribute derivation module 471 can access table 411. As depicted, table 411 is contained in web page 416. Web page 416 is accessible via Uniform Resource Locator (URL) 417. Table 411 has subject column 412, column 413, etc. Subject column 412 contains entities of the table including entities 412A, 412B, etc. Column 413 contains corresponding attributes of the entities in (i.e., on the same row as) subject column 412 including attributes 413A, 413B, etc. Column 414 contains corresponding attributes of the entities in (i.e., on the same row as) subject column 412 including attributes 413A, 413B, etc. Other columns of table 411 can contain other corresponding attributes of the entities in (i.e., on the same row as) subject column 412.

Method 500 includes for each column in the one or more other columns of the table and for each row of the column, deriving a sematic attribute for the row from an entity for the row, the name of the column, and the corresponding value in the column (502). For example, semantic attribute derivation module 471 can derive semantic attribute 461 for attribute 413A. Semantic attribute 461 is derived from entity 412A, column (name) 413, and attribute 413A. Similarly, semantic attribute derivation module 471 can derive semantic attribute 462 for attribute 414A. Semantic attribute 462 is derived from entity 412A, column (name) 414, and attribute 414A. Likewise, semantic attribute derivation module 471 can derive semantic attribute 463 for attribute 413B. Semantic attribute 463 is derived from entity 412B, column (name) 413, and attribute 413B. Semantic attribute derivation module 471 can also derive semantic attribute 464 for attribute 414B. Semantic attribute 464 is derived from entity 412B, column (name) 414, and attribute 414B.

Semantic attribute derivation module 471 can send semantic attributes 461, 462, 463, and 464 to occurrence rate calculation module 401. Occurrence rate calculation module can receive semantic attributes 461, 462, 463, and 464 from semantic attribute derivation module 471.

In one aspect, semantic attribute derivation module 471 derives semantic attributes for any accessible tables. For example, semantic attribute derivation module 471 can also derive semantic attributes for values in table 421 as well as other tables in web snapshot 111 and/or curated dataset 112. As depicted, table 421 includes subject column 422, column 423, column 424, etc. Subject column 422 includes entities 422A, 422B, etc. Column 423 includes attributes 423A, 423B, etc. Column 424 includes attributes 424A, 424B, etc. Thus, semantic attribute derivation module 471 can derive semantic attributes for attributes 423A, 423B, etc., and for attributes 424A, 424B, etc.

Method 500 includes for each column in the one or more other columns of the table and for each row of the column, calculating an occurrence rate for the semantic attribute by counting the occurrences of at least part of the semantic attribute within other table related data (503). For example, occurrence rate calculation module 401 can calculate an occurrence rate for each of semantic attributes 461, 462, 463, 464, etc. by counting the occurrences of each of semantic attributes 461, 462, 463, 464, etc. within other table related data. Calculating occurrences in other table related data can include counting occurrences in other tables (table 421, other tables in web snapshot 111, other tables in curated data set 112, etc.) and/or accessing click count data from query log 406 (or click logs 113).

For example, for each of semantic attributes 461, 462, 463, 464, etc. table count module 402 can calculate the number of occurrences of the semantic attribute in other tables. Table count module 402 can calculate how many other tables include semantic attribute 461, how many other tables include semantic attribute 462, how many other tables include semantic attribute 463, how many other tables include semantic attribute 464, etc. For example, table count module 402 can determine if semantic attribute 461 is included in table 421, etc.

Determining if a semantic attribute derived from one table is included in another table can include comparing semantic attributes. For example, table count module 402 can compare semantic attribute 461 to semantic attributes derived from the contents of table 421. Similarly, table count module 402 can compare semantic attributes 461, 462, 463, 464, etc. to semantic attributers derived from tables in web snapshot 111, curated data set 112, etc.

Query count module 403 can refer to query log 406 (and/or click logs 113) to access click count data for semantic attribute, such as, semantic attributes 461, 462, 463, 464, etc. derives from a tables. For example, query count module 403 can submit semantic query 461 to query log 406. Query log 406 can refer to log entry 448. Log entry 448 is for query 441. Query 441 includes a combination of entity 412A and column 413. Log entry 448 indicates that URLs 442 and 417 have been selected from search results presented in response to query 241. URLs 442 and 417, are associated with corresponding click counts 444 and 446, and 247 respectively. Each click count indicates how often a corresponding URL was selected from presented search results.

As described, URL 417 is the URL for accessing Web page 416. As such, query log 406 can return click count 446 to query count module 403 for semantic attribute 461. Click count 446 indicates how often URL 417 was selected from search results presented in response to query 441 (a query that contains both entity 412A and column (name) 413).

Query count module 403 can similarly refer to query log 206 (or click logs 113) for semantic attributes 462, 463, 464, etc. to obtain corresponding click counts.

A representative query can include any query for which an ECV triple could be an answer. Using an query for which an ECV table could be an answer is useful with respect to surfacing answers from tables on web search engines, given that subsets of a table can be ranked and surfaced (which may be a single row of a table or even just a single face (i.e., a ECV triple)).

In some aspects, table count module 402 calculates an occurrence rate for a semantic attribute based on the number of occurrences of the semantic attribute in other tables. In another aspect, query count module 403 calculates an occurrence rate for a semantic attribute based on a click count for the semantic attribute. In a further aspect, table count module 402 and query count module 403 interoperate to calculate an occurrence rate for a semantic attribute based on the number of occurrences of the semantic in other tables and based on a click count for the semantic attribute. For example, table count module 402 and/or query count module 403 can calculate occurrence rates 451, 452, 453, 454, etc. for semantic attributes 461, 462, 463, 464, etc. respectively.

Occurrence rate calculation module 401 can send semantic attributes and corresponding occurrence rates to feature determination module 404. For example, occurrence rate calculation module 401 can send semantic attribute 461 and occurrence rate 451, semantic attribute 462 and occurrence rate 452, semantic attribute 463 and occurrence rate 453, attribute 463 and occurrence rate 453, etc. to feature determination module 404. Feature determination module 404 can receive semantic attributes and corresponding occurrence rates from occurrence rate calculation module 401. For example, feature determination module 404 can receive semantic attribute 461 and occurrence rate 451, semantic attribute 462 and occurrence rate 452, semantic attribute 463 and occurrence rate 453, attribute 463 and occurrence rate 453, etc. from occurrence rate calculation module 401.

Method 500 incudes determining a feature for use in ranking the table relative to other tables by aggregating the calculated occurrence rates for each semantic attribute of the column (504). For example, feature determination module 404 can determine feature 467 by aggregating occurrence rates 451, 452, 453, 454, etc. Feature 467 can indicate the popularity and/or trustworthiness of table 411 relative to other tables. Feature 467 can be used to rank table 411 relative to other tables, such as, for example, tables 421, and 431, or other tables in web snapshot 111 and/or curated dataset 112 (e.g., in search results). Feature 467 can be sent to index building module 106 for use in formulating indices, such as, indices 121, 122, 123, etc.

In one aspect, feature determination module 404 averages a top N (e.g., N=2, N=5, N=10) occurrence rates when determining feature 467. Averaging a top N occurrence rates can compensate for the influence of tail entities that might otherwise overly influence feature 467.

More popular and/or more trustworthy tables can be ranked higher in search results.

Computing Features Of Table Entities

Figure 6:
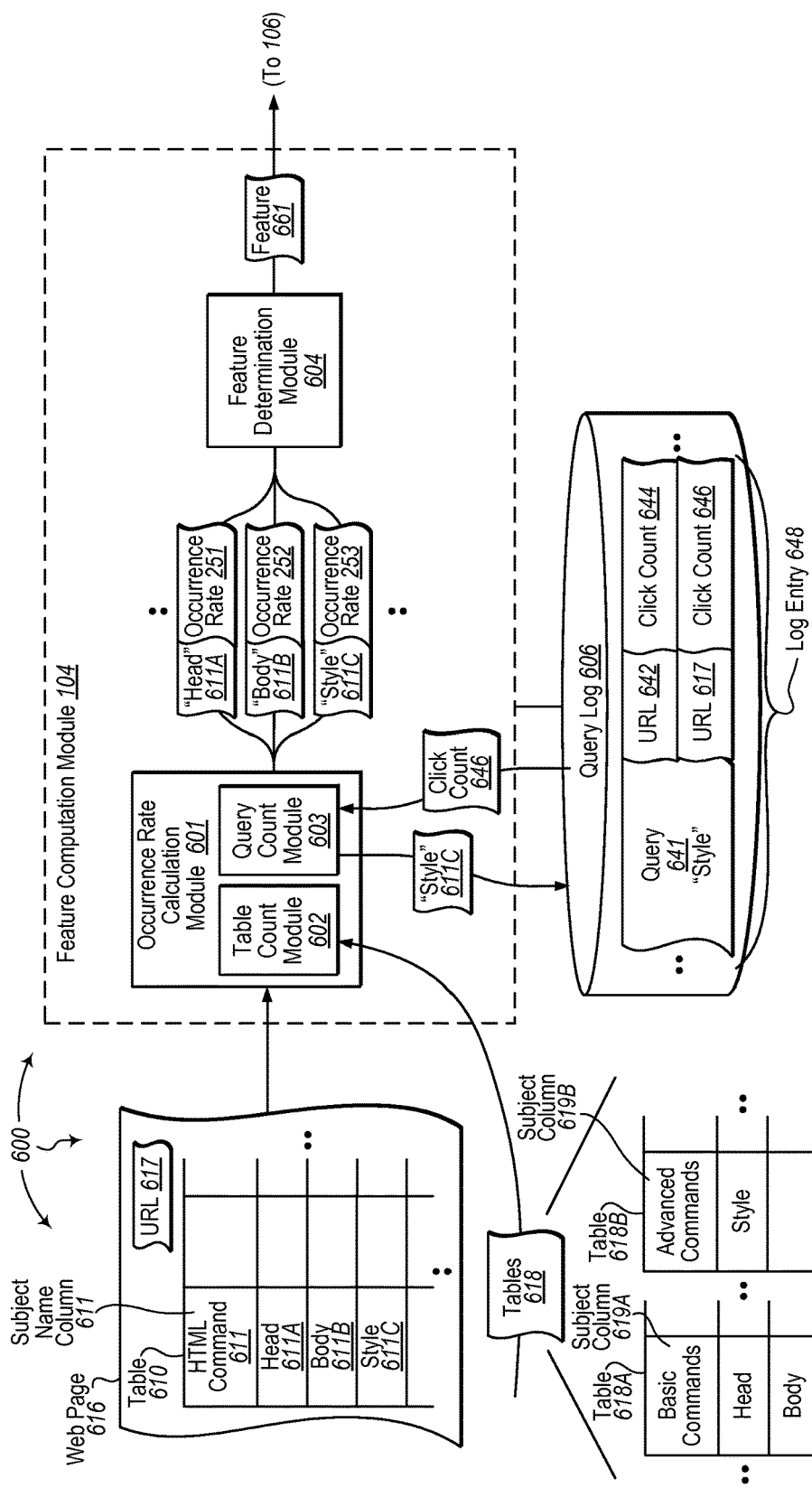
FIG. 6 illustrates an example of computing features of table entities.

FIG. 6 illustrates an example 600 of computing static features of table entities. As depicted, Web page 616 is accessible via URL 617. Web page 616 contains table 610. Table 610 includes subject name column 611 "HTML Command". In subject name column 611 are entity 611A "Head", entity 611B "Body", entity 611C "Style", etc. Tables 618 (e.g., included in web snapshot 111 and/or curated data set 112) includes tables 618A and 618B. Table 618A includes subject name column 619A "Basic Commands" with entity values of head, body, etc. Table 618B includes subject name column 619B "Advanced Commands" with entity values of style, etc.

Occurrence rate calculation module 601 can access table 610 and tables 618. Occurrence rate calculation module 601 can determine a count for entity 611A "Head", entity 611B "Body", entity 611C "Style", etc.

Table count module 602 can determine the occurrences of each of entity 611A "Head", entity 611B "Body", entity 611C "Style", etc. in the subject name column of other tables. For example, table count module 602 can determine that entity 611A "Head" and entity 611B "Body" occur in subject name column 619A. Similarly, table count module 602 can determine that entity 611C "Style" occurs in subject name column 619B.

Query count module 603 can refer to query log 606 (and/or click logs 113) to access click count data for each entity, such as, entity 611A "Head", entity 611B "Body", entity 611C "Style", etc. For example, query count module 603 can submit entity 611C "style" to query log 606. Query log 606 can refer to log entry 648. Log entry 648 is for query 241, a log entry for a query that includes "style". Log entry 248 indicates that URLs 642, 617, etc. have been selected from search results presented in response to query 241. URLs 642, 617, etc. are associated with corresponding click counts 644, 246, etc. respectively. Each click count indicates how often a corresponding URL was selected from presented search results.

As described, URL 617 is the URL for accessing Web page 616. As such, query log 606 can return click count 646 to query count module 603 for entity 611C "style". Click count 646 indicates how often URL 617 was selected from search results presented in response to query 641.

Query count module 603 can similarly refer to query log 606 (or click logs 113) for entity 611A "Head", entity 611B "Body", to obtain corresponding click counts.

In some aspects, table count module 602 calculates an occurrence rate for an entity based on the number of occurrences of the entity in other tables. In another aspect, query count module 603 calculates an occurrence rate for an entity based on a click count for the entity. In a further aspect, table count module 602 and query count module 603 interoperate to calculate an occurrence rate for an entity based on the number of occurrences of the entity in other tables and based on a click count for the entity. For example, table count module 602 and/or query count module 603 can calculate occurrence rates 651, 652, 653, etc. for entities 611A "Head", 611B "Body", 611C "Style", etc.

Occurrence rate calculation module 601 can send entities and corresponding occurrence rates to feature determination module 604. For example, occurrence rate calculation module 601 can send entity 611A "Head" and occurrence rate 651, entity 611B "Body" and occurrence rate 652, entity 611C "Style" and occurrence rate 653, etc. to feature determination module 604. Feature determination module 604 can receive entities and corresponding occurrence rates from occurrence rate calculation module 601. For example, feature determination module 604 can receive entity 611A "Head" and occurrence rate 651, entity 611B "Body" and occurrence rate 652, entity 611C "Style" and occurrence rate 653, etc. from occurrence rate calculation module 601.

Feature determination module 604 can determine feature 661 by aggregating occurrence rates 651, 652, 653, etc. Feature 661 can indicate the popularity and/or trustworthiness of table 611 relative to other tables. Feature 661 can be used to rank table 610 relative to other tables (e.g., in search results), such as, for example, tables 618A and 619B, or other tables in web snapshot 111 and/or curated dataset 112. Feature 261 can be sent to index building module 106 for use in formulating indices, such as, indices 121, 122, 123, etc.

Occurrence rate calculation module 601 and feature determination module 604 can be included in feature computation module 104. Alternatively, occurrence rate calculation module 601 and feature determination module 604 can operate outside of feature computation module 104.

Computing Features Of Table Attributes

Figure 7A:
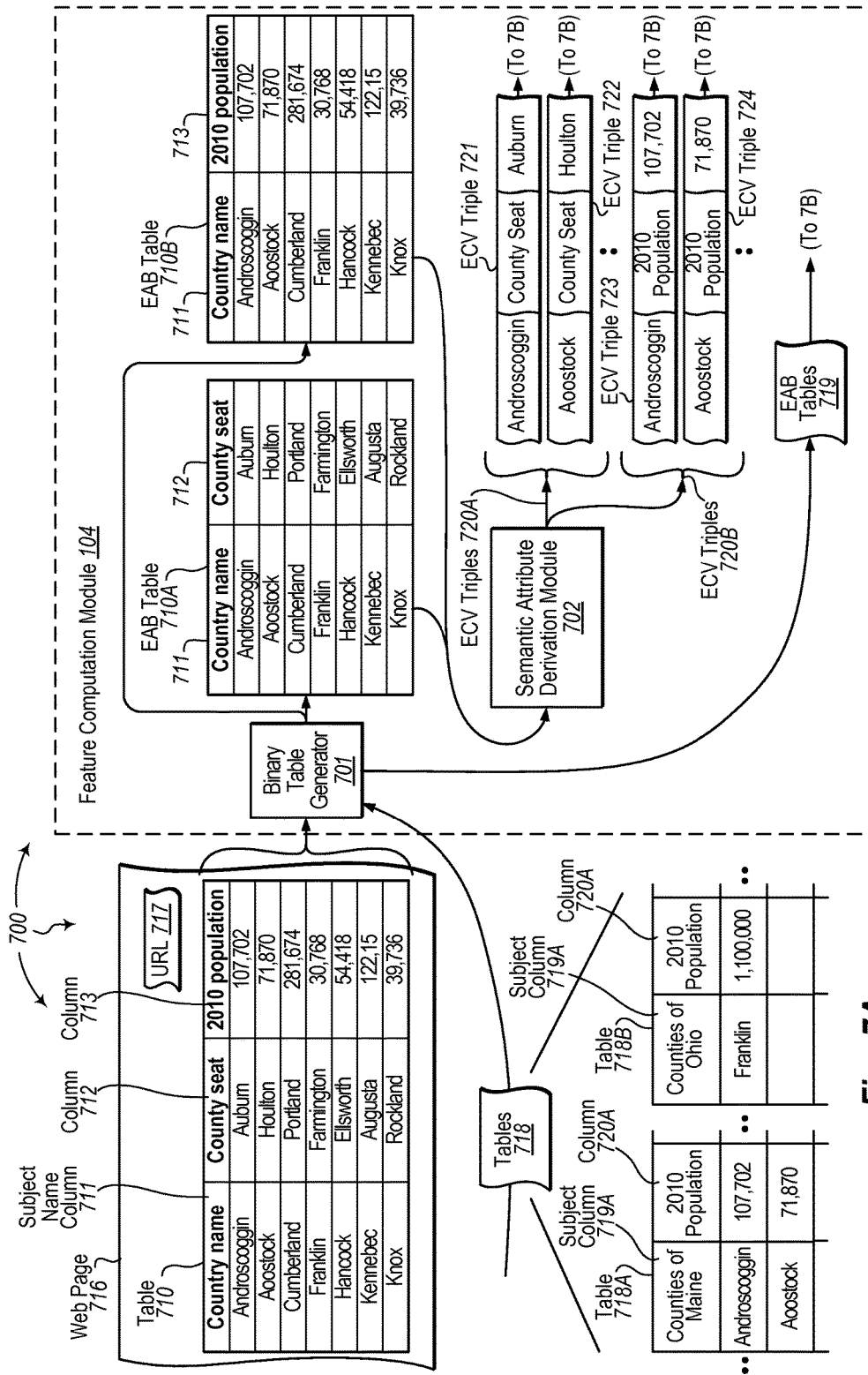
FIGS. 7A and 7B illustrate an example of computing features of table attributes.
Figure 7B:
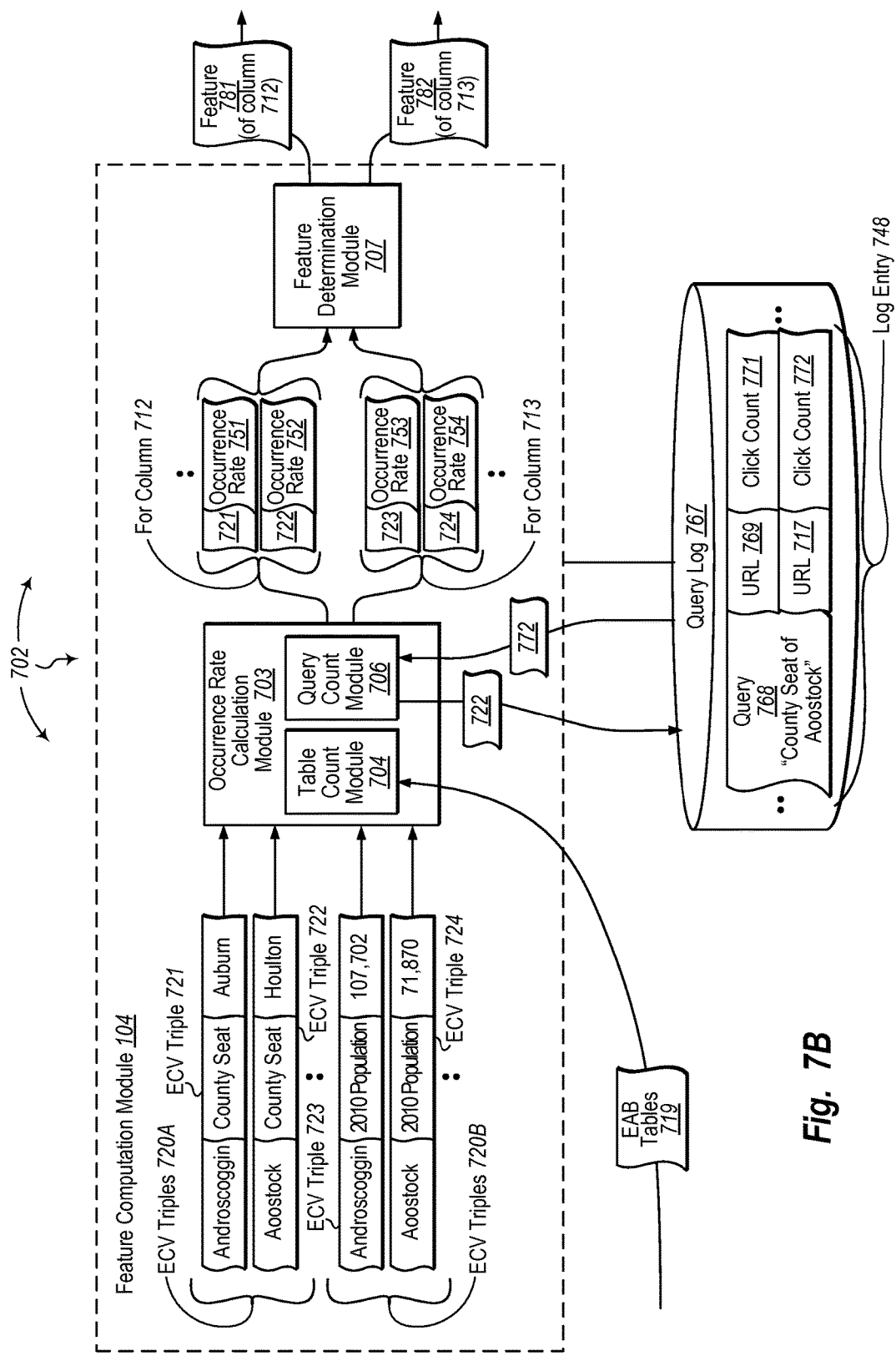

FIGS. 7A and 7B illustrate an example 700 of computing features of table attributes. As depicted, Web page 716 is accessible via URL 717. Web page 716 contains table 710. Table 710 contains information for Counties in the State of Maine. Table 710 includes subject name column 611 "County name", column "County seat", and column "2010 population". Tables 718 (e.g., included in web snapshot 111 and/or curated data set 112) includes tables 718A and 718B. Table 718A includes subject name column 719A "Counties of Maine" and column 720A "Population". Table 718B includes subject name column 719B "Counties of Ohio" and column 720B "Population".

Binary table generator 701 can access table 710. Binary table generator can generate (n-1) Entity-Attribute binary ("EAB") tables for table 710, where n is the number of columns. An Entity-Attribute binary ("EAB") table for each generated for each non-subject column of table 710. Each EAB table generated from table 710 includes subject name column 711 and one other column from table 710. For example, EAB table 710A is an EAB table for column 712. EAB table 710A includes subject name column 711 and column 712. Similarly, EAB table 710B is an EAB table for column 713. EAB table 710B includes subject name column 711 and column 713.

Binary table generator 701 can also generate EAB tables 719 for tables 718A, 718B, etc. EAB tables 719 can be generated similar to generation of EAB tables 710A and 710B.

Binary table generator 701 can send EAB tables 710A and 710B to semantic attribute derivation module 702. Semantic attribute derivation module 702 can receive EAB tables 710A and 710B from binary table generator 701.

For each EAB table semantic attribute derivation module 702 can derive a set of entity-column name-value ("ECV") triples. Each ECV triple includes an entity value, a column name, and an attribute value. For example, semantic attribute derivation module 702 can derive ECV triples 720A for table 710A. Each ECV triple in ECV triples 720A, such as, for example, EVC triples 721 and 722, include a value from subject name column 711, the name of column 712, and a corresponding attribute value from column 712. Similarly, semantic attribute derivation module 702 can derive ECV triples 720B for table 710B. Each ECV triple in ECV triples 720B, such as, for example, EVC triples 723 and 724, include a value from subject name column 711, the name of column 713, and a corresponding attribute value from column 713.

Semantic attribute derivation module 702 can send ECV triples 720A, 720B, etc. to occurrence rate determination module 703.

In one aspect, binary table generator 701 sends EAB tables 719 to occurrence rate determination module 703.

In another aspect, binary table generator 701 sends EAB tables 719 to semantic attribute derivation module 702. Semantic attribute derivation module 702 can generate ECV triples from EAB tables 719. Thus, ECV triples can be generated for columns of tables 718A, 718B, for columns other tables in web snapshot 111, for columns of other tables in curated data set, etc. Semantic attribute derivation module 702 then sends ECV triples for columns of tables 718A, 718B, for columns other tables in web snapshot 111, for columns of other tables in curated data set, etc. to occurrence rate determination module 703.

Occurrence rate determination module 703 can receive ECV triples 720A, 720B, etc. from semantic attribute derivation module 702. As appropriate, occurrence rate determination module 703 can also receive EAB tables 710 or ECV triples corresponding to EAB tables 710.

For each of ECV triples 721, 722, etc. and ECV triples 723, 724, etc., table count module 704 can calculate the number of occurrences of the ECV triple in other tables. Determining if an ECV triple is included in another table can include comparing the ECV triple to one or more of: the other table, EAB tables generated from the other table, or ECV triples derived from generate EAB tables for the other table. For example, table count module 704 can calculate that ECV triples 723 and 724 occur in table 718A.

On the other hand, an ECV triple "Franklin"-"2010 Population"-"30,768" derived from table 710 does not occur in table 718B. As depicted, table 718B contains an entity "Franklin" and a column "2010 Population". However, the value for "2010 Population" for the entity "Franklin" is 1,100,000. As such, a corresponding ECV triple is "Franklin"-"Population"-"1,100,000" does match "Franklin"-"2010 Population"-"30,768". This is a correct result, since table 718B is for "Counties of Ohio".

For each of ECV triples 721, 722, etc. and ECV triples 723, 724, etc., query count module 706 can refer to query log 767 (and/or click logs 113) to access corresponding click count data. For example, query count module 706 can submit ECV triple 722 to query log 767.

Various different query formats can correspond to an ECV triple. Query count module 706 can be robust to identify queries that correspond to ECV triples even when minor variations or different formats are present between the content of an ECV triple and a query. Query count module 706 compensate for minor variations (e.g., misspellings, less relevant numerical differences, etc.) to appropriately identify.

For ECV triple 722, query log 767 can refer to log entry 748. Log entry 748 is for query 768. It can be determined that query 768 "County Seat of Aoostock" corresponds to ECV triple 722. Query 768 is in a format Column Name ("County Seat") of Entity ("Aoostock"). A different query for "Aoostock County Seat" can also correspond to ECV triple 722. The query is in a format Entity ("Aoostock")+Column Name ("County Seat").

Log entry 748 indicates that URLs 769 and 717 have been selected from search results presented in response to query 768. URLs 769 and 717, are associated with corresponding click counts 771 and 772 respectively. Each click count indicates how often a corresponding URL was selected from presented search results.

As described, URL 717 is the URL for accessing Web page 716. As such, query log 767 can return click count 772 to query count module 706 for ECV triple 722. Click count 772 indicates how often URL 717 was selected from search results presented in response to query 768.

Query count module 706 can similarly refer to query log 767 (or click logs 113) for ECV triples 721, 723, 724 etc. to obtain corresponding click counts.

In some aspects, table count module 704 calculates an occurrence rate for an ECV triple based on the number of occurrences of the ECV triple in other tables. In another aspect, query count module 706 calculates an occurrence rate for an ECV triple based on a click count for the ECV triple. In a further aspect, table count module 704 and query count module 706 interoperate to calculate an occurrence rate for an ECV triple based on the number of occurrences of the ECV triple in other tables and based on a click count for the ECV triple. For example, table count module 704 and/or query count module 706 can calculate occurrence rates 751, 752, 753, 754, etc. for ECV triples 721, 722, 723, and 724, etc. respectively.

Occurrence rate calculation module 703 can send ECV triples and corresponding occurrence rates to feature determination module 707. For example, occurrence rate calculation module 703 can send ECV triple 721 and occurrence rate 751, ECV triple 722 and occurrence rate 752, ECV triple 723 and occurrence rate 753, ECV triple 724 and occurrence rate 754, etc. to feature determination module 707. Feature determination module 707 can receive ECV triples and corresponding occurrence rates from occurrence rate calculation module 707. For example, feature determination module 707 can receive ECV triple 721 and occurrence rate 751, ECV triple 722 and occurrence rate 752, ECV triple 723 and occurrence rate 753, ECV triple 724 and occurrence rate 754, etc. from occurrence rate calculation module 707.

Feature determination module 707 can determine a feature for each column of table 710. For example, feature determination module 707 can determine feature 781 (for column 712) by aggregating occurrence rates 751, 752, etc. Feature 781 can indicate the popularity and/or trustworthiness of column 712. Similarly, feature determination module 707 can determine feature 782 (for column 713) by aggregating occurrence rates 753, 754, etc. Feature 781 can indicate the popularity and/or trustworthiness of column 712. Features 781 and 782 can be sent to index building module 106 for use in formulating indices, such as, indices 121, 122, 123, etc.

Features can be used to rank columns in one table relative to other similar columns in other tables. One column of a table may be particularly popular and/or trustworthy relative to other similar columns in other tables. As such, the column can be ranked higher than other columns. For example, feature 782 can be used to indicate the popularity and/or trustworthiness of column 713 relative to column 720A.

Features can also be aggregated to determine a table feature. For example, feature 781 and 782 can be aggregated to determine a feature of table 710. The feature of table 710 can be used to rank table 710 relative to other tables, such as, for example, tables 718, or other tables in web snapshot 111 and/or curated dataset 112 (e.g., in search results). The feature of table 710 can be sent to index building module 106 for use in formulating indices, such as, indices 121, 122, 123, etc.

ECV triples can relate to subject-predicate-object (SPO) triples for a Resource Description Framework (RDF). SPO triples can be used to represent facts on the "semantic web". The presences of SPO triples in an RDF knowledge base can be used to increase the ranking of a table containing an ECV triple that matches an SPO triple from the knowledge base. Similarly, ranking of a SPO in a knowledge base can be influenced by counts of the ECV fact in web tables (e.g., from a system that returns tuples from a knowledge base rather than one that ranks the tables).

Granularity of Feature Determination and Ranking

Features can be determined for portions of a table at any granularity, including cell and individual dimension (e.g., row or column). Rows and columns can be viewed interchangeably, since a table can be rotated 90 degrees to transition columns to rows and transition rows to columns. Features can also be used for ranking at any granularity. If a table has a particularly popular and/trustworthy dimension (e.g., row or column), features can be used to rank the dimension higher than other similar dimensions at other tables (even if the table containing the dimension is otherwise less popular and/or less trustworthy). Similarly, if a table has a particularly popular and/or trustworthy cell, features can be used to rank the cell higher than other similar cells at other tables (even if the dimension and/or table containing the cell is otherwise less popular and/or less trustworthy).

More popular and/or trustworthy cells and dimensions can be ranked higher in search results. Search results can be presented at a granularity similar to features used to rank items returned in search results. For example, when a feature indicates that an individual dimension or cell of a table is more popular and/or more trustworthy, the individual dimension or cell can be presented in search results.

Other portions of a table or dimension can be omitted. For example, when a dimension is presented, other dimensions of a table can be omitted. When a cell is presented, other cells of a dimension can be omitted. Search results can include a link to omitted portions, for example, to a full dimension or full table.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the method for indexing a table for ranking the table, the method comprising a processor:
   accessing a table, the table including a subject column, a non-subject column, and a plurality of rows, cells of the table being at intersections between the columns and rows, the table annotated with a portion of other content relevant to describing the table;
   generating an index for the table by indexing at least over data within the table along with the portion of other content;
   storing the index improving the relevance of providing the table in search results;
   refining the index for the table, comprising:
      deriving a semantic attribute for a cell at the intersection of the non-subject column and a row of the table, the semantic attribute derived by combining: (1) a value in the cell, (2) another value in another cell at the intersection of the subject column and the row, and (3) a name value for the non-subject column into the semantic attribute, the semantic attribute providing additional information to distinguish the value in the cell from the value in other cells;
      calculating a frequency with which the semantic attribute is included in a plurality of other tables;
      calculating a relevance of the semantic attribute based on inclusion of the semantic attribute in the plurality of other tables and based on features of the plurality of other tables;
      determining a feature of the table by aggregating the semantic attribute, the calculated frequency of occurrence of the semantic attribute, the calculated relevance of the semantic attribute into the feature of the table, and the portion of other content;
      refining the index for the table by indexing over the cell and the feature of the table; and
      storing the refined index further improving the relevance of providing the table in search results; and
   surfacing results from the table that satisfy a search query based on a ranking for the table determined from the refined index.

2. The method of claim 1, wherein deriving a semantic attribute comprises combining an entity-column name-value triple for the row.

3. The method of claim 2, wherein deriving a semantic attribute comprises:
   generating an entity-attribute binary table for the row, the entity-attribute binary table having a first column corresponding to the subject column;
   formulating an entity-column name-value triple from the entity-attribute binary table; and
   wherein calculating an occurrence rate for the semantic attribute comprises counting the occurrence rate of the entity-column name-value triple across entity-attribute binary tables generated for one or more other tables.

4. The method of claim 3, wherein the table includes a second non-subject column, and further comprising:
   deriving another semantic attribute for a further cell at the intersection of the second non-subject column and the row, the other semantic attribute derived by combining: (1) a further value in the further cell, (2) the other vales in the other cell, and (3) a name value for the second non-subject column into the other semantic attribute, the other semantic attribute providing additional information to distinguish the further value in the further cell from the further value in other cells;
   calculating another frequency with which the other semantic attribute is included in a second plurality of other tables;
   calculating another relevance of the other semantic attribute based on inclusion of the other semantic attribute in the second plurality of other tables and based on features of the second plurality of other tables; and
   wherein determining a feature of the table comprises determining the feature of the table by aggregating the other semantic attribute, the frequency of occurrence of the other semantic attribute, and the relevance of the other semantic attribute into the feature.

5. The method of claim 4, further comprising calculating an additional frequency with which the other semantic attribute was selected from presented search results; and
   wherein determining the feature of the table comprises aggregating the additional frequency of the other semantic attribute into the feature.

6. The method of claim 1, further comprising:
   deriving another semantic attribute for a further cell at the intersection of the non-subject column and another row, the other semantic attribute derived by combining: (1) a further value in the further cell, (2) a further other value in a further other cell at the intersection of the subject column and the other row, and (3) the name value for the non-subject column into the other semantic attribute, the other semantic attribute providing additional information to distinguish the further value in the further cell from the further value in other cells;
   calculating another frequency with which the other semantic attribute is included in a second plurality of other tables;
   calculating another relevance of the other semantic attribute based on inclusion of the other semantic attribute in the second plurality of other tables and based on features of the second plurality of other tables; and
   wherein determining a feature of the table comprises determining the feature of the table by aggregating the other semantic attribute, the frequency of occurrence of the other semantic attribute, and the relevance of the other semantic attribute into the feature.

7. The method of claim 1, further comprising calculating an additional frequency with which the semantic attribute was selected from presented search results; and
   wherein determining the feature of the table comprises aggregating the additional frequency of the semantic attribute into the feature.

8. The method of claim 6, wherein determining a feature of the table comprises determining one or more of:
   a popularity of the table, or
   a trustworthiness of the table.

9. The method of claim 1, wherein determining a feature of the table comprises determining one or more of: a trustworthiness of the table or a popularity of the table.

10. A computer program product for use at a computer system, the computer program product for implementing a method for indexing a table for ranking the table, the computer program product comprising one or more hardware storage devices having stored thereon computer-executable instructions that, when executed at a processor, cause the computer system to perform the method, including the following:
    access a table from system memory, the table including a subject column, a non-subject column, and a plurality of rows, cells of the table being at intersections between columns and rows, the table annotated with a portion of other content relevant to describing the table;

generating an index for the table by indexing at least over data within the table along with the portion of other content;

storing the index improving the relevance of providing the table in search results;

refining the index for the table, comprising:
 derive a semantic attribute for a cell at the intersection of the non-subject column and a row of the table, the semantic attribute derived by combining: (1) a value in the cell, (2) another value in another cell at the intersection of the subject column and the row, and (3) a name value for the non-subject column into the semantic attribute, the semantic attribute providing additional information to distinguish the value in the cell from the value in other cells;
 calculate a frequency with which the semantic attribute is included in a plurality of other tables;
 calculate a relevance of the semantic attribute based on inclusion of the semantic attribute in the plurality of other tables and based on features of the plurality of other tables;
 determine a feature of the table by aggregating the semantic attribute, the calculated frequency of occurrence of the semantic attribute, the calculated relevance of the semantic attribute into the feature of the table, and the portion of other content;
 refine the index for the table by indexing over the cell and the feature of the table; and
 store the refined index further improving the relevance of providing the table in search results; and surface results from the table that satisfy an Internet search query based on a ranking for the table determined from the refined index.

11. The computer program product of claim 10, wherein computer-executable instructions that, when executed, cause the computer system to derive a semantic attribute comprise computer-executable instructions that, when executed, cause the computer system to combine an entity-column name-value triple for the row.

12. The computer program product of claim 10, wherein computer-executable instructions that, when executed, cause the computer system to derive a semantic attribute for the row comprise computer-executable instructions that, when executed, cause the computer system to:
 generate an entity-attribute binary table for the row, the entity-attribute binary table having a first column corresponding to the subject column; and
 derive an entity-column name-value triple from the entity-attribute binary table.

13. The computer program product of claim 12, wherein computer-executable instructions that, when executed, cause the computer system to calculate an occurrence rate for the semantic attribute comprise computer-executable instructions that, when executed, cause the computer system to count the occurrence rate of the entity-column name-value triple across entity-attribute binary tables generated for the plurality of tables.

14. The computer program product of claim 12, wherein computer-executable instructions that, when executed, cause the computer system to calculate an occurrence rate for the semantic attribute comprise computer-executable instructions that, when executed, cause the computer system to:
 refer to a query log, the query log containing queries and corresponding uniform resource locator (URL) click counts, for each query, the corresponding uniform resource locator (URL) click counts representing how often each of one of more uniform resource locators (URLs) were selected from among search results responsive to the query; and
 for a query representative of the entity-column name-value triple, determine a click count for a uniform resource locator (URL) to a web page containing the table.

15. A computer system, the computer system comprising:
one or more hardware processors; and
system memory coupled to the one or more hardware processors, the system memory storing instructions that are executable by the one or more hardware processors, the one or more processors executing the instructions stored in the system memory to:
 access a table from the system memory, the table including a subject column, a non-subject column, and a plurality of rows, cells of the table being at intersections between columns and rows, the table annotated with a portion of other content relevant to describing the table;
 generate an index for the table by indexing at least over data within the table along with the portion of other content;
 store the index improving the relevance of providing the table in search results;
 refine the index for the table, comprising:
  derive a semantic attribute for a cell at the intersection of the non-subject column and a row of the table, the semantic attribute derived by combining: (1) a value in the cell, (2) another value in another cell at the intersection of the subject column and the row, and (3) a name value for the non-subject column into the semantic attribute, the semantic attribute providing additional information to distinguish the value in the cell from the value in other cells;
  calculate a frequency with which the semantic attribute is included in a plurality of other tables;
  calculate a relevance of the semantic attribute based on inclusion of the semantic attribute in the plurality of other tables and based on features of the plurality of other tables;
  determine a feature of the table by aggregating the semantic attribute, the calculated frequency of occurrence of the semantic attribute, the calculated relevance of the semantic attribute into the feature of the table, and the portion of other content;
  refine the index for the table by indexing over the cell and the feature of the table; and
  store the refined index further improving the relevance of providing the table in search results; and
 surface results from the table that satisfy a search query based on a ranking for the table determined from the refined index.

16. The computer system of claim 15, wherein the one or more hardware processors executing the instructions stored in the system memory to derive a semantic attribute comprises the one or more hardware processors executing the instructions stored in the system memory to combine an entity-column name-value triple for the row.

17. The computer system of claim 15, wherein the one or more hardware processors executing the instructions stored in the system memory to derive a semantic attribute comprises the one or more hardware processors executing the instructions stored in the system memory to:

generate an entity-attribute binary table for the row, the entity-attribute binary table having a first column corresponding to the subject column; and derive an entity-column name-value triple from the entity-attribute binary table.

18. The computer system of claim 17, wherein the one or more hardware processors executing the instructions stored in the system memory to calculate an occurrence rate for the semantic attribute comprises the one or more hardware processors executing the instructions stored in the system memory to count the occurrence rate of the entity-column name-value triple across entity-attribute binary tables generated for one or more other tables in the plurality of other tables.

19. The computer system of claim 17, wherein the one or more hardware processors executing the instructions stored in the system memory to calculate an occurrence rate for the semantic attribute comprises the one or more hardware processors executing the instructions stored in the system memory to:

refer to a query log, the query log containing queries and corresponding uniform resource locator (URL) click counts, for each query, the corresponding uniform resource locator (URL) click counts representing how often each of one of more uniform resource locators (URLs) were selected from among search results responsive to the query; and for a query representative of the entity-column name-value triple, determine a click count for a uniform resource locator (URL) to a web page containing the table.

20. The computer system of claim 15, wherein the one or more hardware processors executing the instructions stored in the system memory to determine a feature of the table comprises the one or more hardware processors executing the instructions stored in the system memory to determine one or more of a popularity and a trustworthiness of the table.

* * * * *